United States Patent [19]

Morii et al.

[11] 4,260,162
[45] Apr. 7, 1981

[54] TONEARM CONTROL SYSTEM

[75] Inventors: Takashi Morii; Junichi Kurata, both of Tokorozawa, Japan

[73] Assignee: Pioneer Electronic Corporation, Tokyo, Japan

[21] Appl. No.: 14,793

[22] Filed: Feb. 26, 1979

[30] Foreign Application Priority Data

Feb. 24, 1978 [JP] Japan .................................. 53/20634

[51] Int. Cl.³ .............................................. G11B 3/06
[52] U.S. Cl. ........................................ 369/33; 369/41; 369/216; 369/219; 369/215
[58] Field of Search ............... 274/15 R, 9 RA, 23 R, 274/23 A; 179/100.4 D, 100.3 V

[56] References Cited

U.S. PATENT DOCUMENTS

| | | | |
|---|---|---|---|
| 3,662,363 | 5/1972 | Chertok | 274/9 RA X |
| 3,937,903 | 2/1976 | Osann | 274/15 R |
| 4,114,893 | 9/1978 | Leach et al. | 274/9 RA |
| 4,135,086 | 1/1979 | Baba | 274/9 RA X |

Primary Examiner—Harry N. Haroian
Attorney, Agent, or Firm—Sughrue, Rothwell, Mion, Zinn and Macpeak

[57] ABSTRACT

A tonearm control device in which tonearm position is detected by counting pulses generated in response to the reversible electric motor output used for providing horizontal tonearm movement. A sensor is employed to detect non-recorded portions between recorded bands and also the initial band. Output pulses are counted in an up counter of a RAM and the counter is compared with a memory stored selection order. When coincidence occurs reproduction of that band is achieved. The counter is controlled to inhibit counting over areas previously scanned. Hence, it is possible to play bands out of order once the portions to be played are scanned.

10 Claims, 2 Drawing Figures

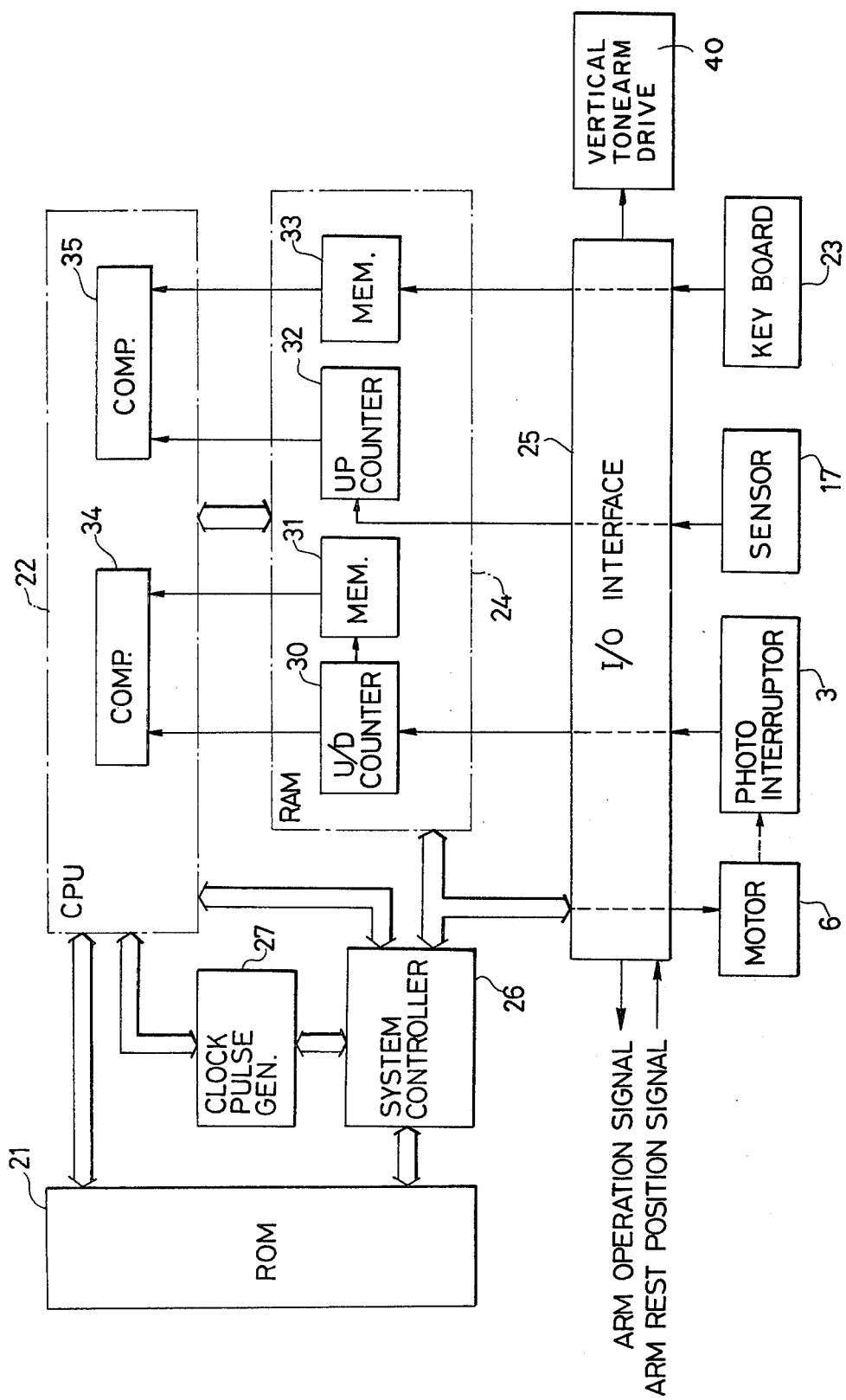
F I G. 2

TONEARM CONTROL SYSTEM

BACKGROUND OF THE INVENTION

This invention relates to a tonearm drive control device, and more particularly to a tonearm drive control device for use in an audio record player having an automatic music selection mechanism (hereinafter referred to merely as an automatic music selection record player, when applicable).

The automatic music selection record player is provided with a memory where music numbers each corresponding to desired music to be reproduced are memorized. There is also provided in the vicinity of a cartridge a sensor capable of detecting both nonrecorded portions of a record disk between an initial record groove and an end record groove of music and an initial record groove of record disk by recognition of a variation of reflection coefficient in the surface of the record disk. Hence the memory is controlled by the output of the sensor to carry out a music selection operation.

Generally, because the above mentioned conventional record player employs the output of the sensor only as a drive control signal in order to carry out the music selection operation, every end of music reproduction signal returns a tonearm to an arm rest. Then, music selection operation starts according to music selection information stored in the memory. Accordingly, this mode of operation is disadvantageous in that selection operation requires a relatively long period of time. Furthermore, the conventional record player has an another disadvantage because it is impossible to start the reproduction of music from the middle of the disk. In this case, it is obvious that the reproduction of music can be possible, if a record disk is initially scanned to memorize all positions of initial record grooves in a memory in advance before starting of the reproduction. However, this results in prolonged periods of wasted time.

SUMMARY OF THE INVENTION

Accordingly, an object of this invention is to eliminate the foregoing drawbacks in the conventional record player.

Another object of this invention is to provide a tonearm drive control device for use in an operable automatic music selection record player, which carries out an automatic music selection operation accurately and rapidly.

Still another object of this invention is to provide a tonearm drive control device for use in an automatic music selection record player, which is capable of starting reproduction of music recorded on a record disk from any position without a preliminary scanning operation for memorizing all positions of initial record grooves.

These and other objects of this invention are accomplished by provision of an automatic music selection record player having a tonearm drive control device. In the record player according to this invention, the position of a tonearm is detected by counting the number of pulses generated in response to the rotation of a reversible electric motor for driving the tonearm horizontally. When a sensor detects a non-recorded portion between an initial record groove and an end record groove of music and an initial record groove of record disk by way of recognizing a variation of reflection coefficient in the surface of record disk, it produces one pulse signal which is up-counted by an upcounter portion of a random access memory (RAM). The content of the up-counter is compared with the content of a music selection order memory of the RAM, previously stored by an operation of a key board. Hence it is possible to carry out the reproduction of music in any order or to start it from any position according to the content of the music address number memory. Furthermore, the up-counter part is designed so that it does not operate to up-count in case of an occurrence of a pulse signal produced when the sensor detects the non-recorded portion previously detected. Therefore, it is also possible to achieve the automatic music selection operation in desired order in an accurate manner.

This invention will be described hereinafter with reference to its preferred embodiment shown in the accompanying drawings.

BRIEF DESCRIPTION OF THE DRAWINGS

In the accompanying drawings:

FIG. 2 is a block diagram illustrating one preferred example of a tonearm drive control device for the linear tracking type tonearm assembly as shown in FIG. 1.

DETAILED DESCRIPTION OF THE PREFERRED EMBODIMENT

Figure 1:
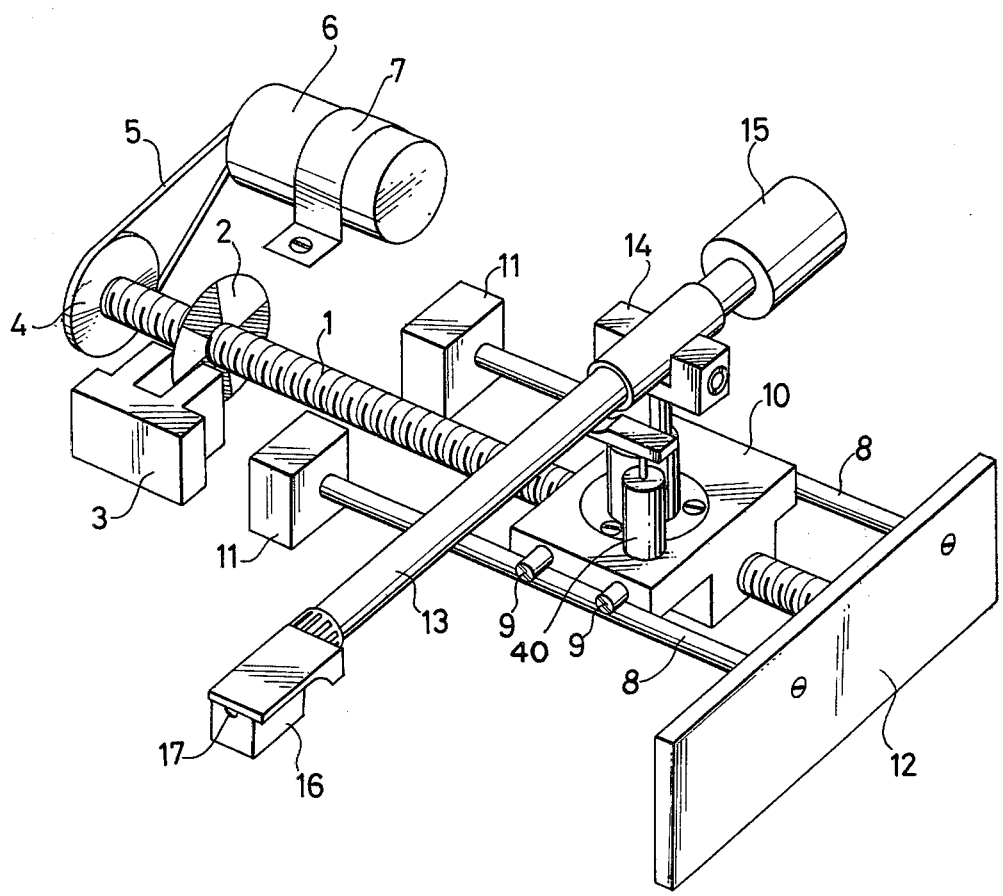
FIG. 1 is a schematic perspective view of one preferred embodiment of a linear tracking type tonearm assembly for use in an automatic music selection record player according to this invention.

In FIG. 1 which is a schematic perspective view of one preferred embodiment of a linear tracking type tonearm assembly according to this invention, a worm-gear member 1 has a horizontal center axis with one end rotatably supported to a supporting member 12 of a record player housing. The other end is provided with a pulley 4. The pulley 4 is driven via a belt 5 by a reversible electric motor 6 which is fixed to a proper portion of the player housing by the use of an atttachment member 7. A sliding member or carriage 10 is provided with rollers 9 and a threaded internal engaging portion which engages with the gear section of the worm-gear member 1. Hence by rotation of the worm-gear member 1, the carriage stably moves along a pair of guide rails 8 and the worm-gear member 1 in accordance with the direction of rotation of the worm-gear member 1 driven by the motor 6.

Accurate alignment of the guide rails is achieved by mounted one end in supporting member 12 and maintaining a parallel arrangement by the use of anchor blocks 11 at the opposite end. The anchor blocks are attached to the frame in any suitable manner.

A tonearm 13 is supported by an arm holder 14 mounted on the sliding member 10, so that it can move in only a vertical direction. The tonearm 13 is provided with a balance weight 15 at its one end and it is provided with a cartridge 16 at the other end thereof. A sensor 17, well known in this art, is used for detecting a nonrecorded portion of record between an initial record groove and an end record groove of music and an initial record groove of a record disk. It is mounted on the cartridge 16, in such a manner that the position of sensor 17 corresponds to that of stylus provided to the cartridge 16.

A shutter member 2 composed of light permeable portions and light impermeable portions is integrally formed at a proper portion of the worm-gear member 1.

The light permeable portions and the light impermeable portions are alternately arranged, as shown in FIG. 1, to generate three pulses per one rotation of the worm-gear member 1. Furthermore, a photo interruptor 3 having a pair of a light emitting means and a light receiving means is disposed to detect the number of rotations of the worm-gear member 1 in such a manner that the light emitting means and the light receiving means face each other. Also, as shown in FIG. 1, the shutter member 2 passes through the gap defined by the light emitting means and the light receiving means to periodically interrupt light emitted from the light emitting means.

FIG. 2 is a block diagram illustrating one example of a tonearm drive control device for the linear tracking type tonearm assembly as shown in FIG. 1. Reference numeral 21 designates a read only memory (ROM) where a program for controlling respective component sections in the tonearm drive control device to deal with several situations is stored in advance of operations. The program is read out according to demands to a central processing unit (CPU) 22 where the read out program is decoded to practically control the operation of the component sections in the drive control device.

The output signal of the photointerruptor 3 representative of the number of rotations of the motor 6, i.e., the number of rotations of the worm-gear member 1, the output signal of the sensor 17 and the output signal of a key board 23 for selecting music and designating the desired music numbers are applied together with a signal representative of the position of the arm rest through an INPUT/OUTPUT interface 25 to a random access memory (RAM) 24 in order to transiently store them therein.

A system controller 26 is interposed between the CPU 22 and the ROM 21, the RAM 24 and the I/O interface 25 to control their operation. The system controller 26 and the CPU 22 are operated by clock pulses generated by a clock pulse generator 27. A motor control signal for controlling the direction of rotation of motor 6 and a tonearm operation signal such as a tonearm elevation signal or a tonearm descent signal for controlling the vertical movement of tonearm, produced by the above component sections of the tonearm drive control device are also outputted through the I/O interface 25.

Specifically, the RAM 24 is composed of an UP/DOWN counter 30, a music address memory 31, an UP counter 32 and a music selection order memory 33. In order to recognize the position of tonearm from a predetermined standard position during reproduction, the U/D counter 30 operates to up/down-count the number of pulses representative of the number of rotations of motor 6, that is the number of rotations of the worm-gear member 1 generated by the photo interruptor 3. In this case, assuming that the motor 6 rotates in forward direction to horizontally slide the tonearm 13 toward the center of record, the U/D counter 30 is designed to count up the number of pulses. Assuming that the motor 6 rotates in reverse direction to horizontally slide the tonearm 13 toward the arm rest, U/D counter 30 is designed to count down the number of pulses.

In one preferred example of this invention, the above mentioned standard position is determined at the position of the arm rest, and the U/D counter 30 is designed to be reset to "0" when the tonearm stays at, or is returned to the arm rest. Therefore, the position of the tonearm, the position of the initial record groove of music or record disk and the like are defined by the number of pulses counted by the U/D counter 30.

The music address memory 31 operates to memorize the content of the U/D counter 30 at an assigned position upon an occurrence of the output pulse signal of the sensor 17. The UP counter 32 is designed so that it operates to count up the number of output pulse signals produced every time the sensor 17 detects the non-recorded portion of record disk, (of course, including the initial record groove). However, it should be noted that the UP counter 32 is designed not to carry out the count up operation in the case when it detects the non-recorded portions which have been already detected. The music selection memory 33 operates to store an order of music selected and designated by the operation of the key board 23.

The CPU 22 comprises a first comparator 34 and a second comparator 35. The first comparator 34 is employed for comparing the content of the U/D counter 30 with that of the memory 31 upon an occurrence of output pulse signal produced by the sensor 17, the second comparator 35 is employed for comparing the content of the UP counter 32 with that of the memory 33 upon an occurrence of output pulse signal produced by the sensor 17. According to the comparison results of the comparators 34 and 35, a tonearm operation signal and/or a motor control signal are then outputted via the I/O interface 25.

In the above tonearm drive control device, a power source is connected to a record player unit, and then the ROM 21 is placed in a so-called "run-state". According to the program stored in the ROM 21, at first, the fact of whether the tonearm is on the arm rest or not is ascertained. If the tonearm is on the arm rest, the U/D counter 30 and the UP counter 32 in the RAM 24 are reset to "0" to be able to receive the output signal from the key board 23 at any time.

The operation of the tonearm drive control device will be described under an assumption that music selection keys 2, 4 and 1 of the key board 23 are operated in order. Upon the operation of the key board 23, binary coded signals representative of the respective music numbers of 2, 4 and 1 are stored in that order at assigned successive portions of the memory 33 in the RAM 24 via the I/O interface 25. Subsequently, according to the program, the coded music number "2" which is stored at the first assigned position of the memory part 33, is read out to the CPU 22 to be compared with the content of the UP counter 32 by the comparator 35 (the counter 32 being now reset to "0").

As a result, the comparator 35 recognizes the fact that the content of the UP counter part 32 does not coincide with that of the memory part 33, and therefore the CPU 22 produces a noncoincidence signal to the I/O interface 25 in order to output a motor control signal to the motor 6 according to the program. The motor 6 rotates in forward direction to horizontally slide the tonearm 13 toward the center of record. During this movement of tonearm 13, the U/D counter 30 of the RAM 24 continues to up-count the number of output pulses generated from the photo interruptor 3.

Thereafter, in the case when the sensor 17 provided with the cartridge 16 detects an initial record groove of record disk, the sensor 17 produces one output pulse via the I/O interface 25 to both U/D and UP counter 30 and 32 of the RAM 24. The UP counter 32 operates to count up the pulse signal as a coded number of 1 corresponding to the music number of "1". The counter 30 operates to transpose to the memory 31 its contents, i.e., the number of pulses generated by the photo interruptor 3, representative of an address of the initial record groove of record disk. The memory 31 stores the contents of the counter 30 at a first assigned position of the memory 31. In the comparator 35, the coded number of "1" of the UP counter 32 is compared with the coded music number of "2" which has been already stored at the first assigned portion of the memory 31. As a result the CPU 22 again produces the non-coincidence signal of the I/O interface 25 in order to output the motor control signal to the motor 6. The motor 6 thus continues to rotate in the same direction.

When the sensor 17 detects a non-recorded portion between the end record groove of the first band of recorded music and the initial record groove of the second band of recorded music, it produces one output pulse. Then, the UP counter 32 operates to up-count again to thereby set the contents of the UP counter 32 to "2". The contents "2" of the UP counter 32 is compared with the "2" stored at the first assigned position of the memory 33. As a result, the CPU 22 produces a coincidence signal to the I/O interface 25. According to the program, a motor stop signal and a tonearm descent signal are applied from the I/O interface 25 to a motor 6 and a well known tonearm drive mechanism 40 respectively. At this time, the content of the U/D counter 30 is simultaneously transposed to the memory 31, where it is stored at the second assigned position of the memory 31.

During the reproduction of the second band of recorded music, the U/D counter 30 continues to count the number of pulses generated by the photo interruptor 3 according to the movement of the tonearm 13 in horizontal direction. When the reproduction of the second band of recorded music is completed, the sensor 17 produces the one output pulse to cause the content the UP counter 32 to be set to "3". The output pulse is also applied to the counter 30. Accordingly, the content of the U/D counter 30 is then transposed to the third assigned position of the memory 31 as an address of an initial record groove of third band of recorded music.

The coded music number of "4" to be reproduced subsequently is read out from the memory 33 to the comparator 35 wherein it is compared with the content of the UP counter 32. As a result of this comparison, a non-coincidence signal is applied to the I/O interface 25, and the I/O interface 25 first produces a tonearm elevation signal, and then it outputs the motor drive signal to the motor 6, so that the motor 6 rotates in the forward direction. In this case, the U/D counter part 30 operates to upcount the number of pulses generated by the photo interruptor 3. Thereafter the sensor 17 detects the non-recorded portion between the third band of recorded music and the fourth band of recorded music. It produces one output pulse which is also applied to the counter 30 to thereby transpose the content of the U/D memory 30 to the fourth assigned position of the memory part 31 as an initial address of the fourth band of recorded music. At this time, the output pulse is upcounted by the UP counter 32 as the music number of "4". The content of the UP counter 32 is compared with that of the memory 33 as described above. As a result, the coincidence signal is applied to the I/O interface 25. I/O interface 25 produces the motor stop signal to the motor 6, and then produces the tonearm descent signal to start the reproduction of the fourth band of recorded music according to the program. As is clear from the above description, the counter 30 continues to up-count the number of pulses generated by the photo interruptor 3 during the reproduction.

When the reproduction of the fourth band of recorded music is completed, the sensor 17 produces one output pulse. The content of the U/D counter 30 is thus transposed to the fifth assigned position of the memory part 31 as an initial address of the fifth band of recorded music in the above described same manner. Simultaneously, the content of the counter part 32 changes to be defined as "5". This content is then compared with that of the memory 33 defined by "1" corresponding to the music number to be reproduced subsequently. As a result, a noncoincidence signal is applied to the I/O interface 25. The I/O interface 25 then produces the tonearm elevation signal together with the motor reverse signal.

It is apparent that the direction in which the motor 6 should be rotated is determined in accordance with the result of the comparison in the comparator 35.

As the tonearm 13 is moved toward the arm rest by the rotation of the motor 6 in the reverse direction, the U/D counter 30 operates to down-count the number of pulses which are also generated by the photo interruptor 3. Because the address representative of the initial position of the band of first recorded music has been already stored at the first assigned position of the memory 31, the corresponding memorized address is read out to the comparator 34 according to the program to compare the content of the counter 30 therewith. When the tonearm 13 reaches the initial position of the first band of recorded music, the above contents are coincident to each other. Accordingly, a coincidence signal is produced from the comparator 34 to the I/O interface 25, and the motor stop signal and the tonearm descent signal are thus applied to the motor 6 and the tonearm driving mechanism, respectively.

Although output pulses are produced by the sensor 17 during the horizontal movement of the tonearm 13 from the end position of the fourth band to the initial position of the first band, the UP counter part 32 is controlled by the program, so that it operates not to count the number of pulses corresponding to the non-recorded portions over which the tonearm 13 has already passed. Thus, the content of the UP counter part 32 are maintained at that defined as "5".

Because an address representative of the end position of the first band has been already stored at the second assigned position of the memory section 31 as that representative of the initial position of the second band, the reproduction of the first band continues until the content of the U/D counter 30 coincides with that stored at the second assigned address of the memory 31, and then the tonearm 13 is elevated from the surface of the record disk. After it has been ascertained that a music number to be subsequently recorded is not stored in the memory section 33, the motor reverse signal is applied to the motor 6 via the I/O interface 25 according to the program. Then the tonearm is returned back above the arm rest, and finally lowered onto the arm rest. The automatic music selection operation for reproducing in the designated order are completed.

The automatic music selection operation for starting from the middle part of the recorded music will be described. For example, in the case where the reproduction starting from the middle part of the second band of recorded music is further required after the above described reproduction of the first recorded music, a signal corresponding to the content defined as "2.5" is read-out from the memory section 33, and then according to the program of the ROM 21, the CPU 22 operates to store in an appropriate assigned position of the memory part 31 the signal representative of an initial position of the 2.5th band of recorded music obtained by a calculation based on the memorized initial addresses of the second and third bands of recorded music. After the elevation of the tonearm 13, the motor 6 continues to rotate until the stored content of the memory 31 is coincident with the coded signal corresponding to the number of pulses generated by the photo interruptor 3 and the tonearm 13 can reach the desired position of the second recorded music. Therefore, it is possible to start the reproduction from any middle part of the bands of recorded music.

It should be noted that, in the case when the reproduction starting from the middle part of the second band is required after all information stored in the memory section 13 are completely released, an operation must be required in addition to the above described operation to store the initial position of respective second and third bands recorded music in the memory 31. That is, the tonearm 13 moves up to the initial position of the third band of recorded music for the additional operation, and is then returned to the desired middle position of the second band of recorded music.

The above mentioned component sections such as the CPU 22, the ROM 21, the RAM 24, the I/O interface 25, the system controller 26 and the clock pulse generator 27 can be integrally formed as a micro-processor. This results in minimizing of the device. For example, a variety of commercially available microprocessors may be used and suitably programmed. The conversion of sensor output to digital signals in the I/O interface 25 is a common operation as well as preprogramming the ROM. Hence, the hardware components shown in FIG. 2 can be obtained from standard available micro-processor units with suitable programming. The RAM, ROM, CPU, clock generator, system controller and I/O interface exist as an integrated circuit designated as MELCS 82 sold by Mitsubishi Denki K. K. If the components are separately configured an Intel 8080A may be used as the CPU. In this case, the clock generator 27 may be an Intel 8224, system controller 26 an Intel 8228 and the I/O interface 25 an Intel 8255. Obviously RAM's comparable with these components can be utilized dependent only on cost and memory capacity.

While this invention is described hereinbefore with respect to only linear tracking type tonearm, it is apparent that modifications are possible without departing from the scope of this invention. That is, this invention is also applicable to the other types tracking tonearm such as a normally used swing tracking type tonearm.

What is claimed is:

1. A tonearm drive control device for use in playing a record disk having bands of music separated by nonrecorded portions comprising:
   a tonearm;
   a reversible electric motor;
   a vertical tonearm drive means for vertically moving a tonearm and horizontal tonearm drive means responsive to the rotation of said motor to horizontally move said tonearm;
   first detecting means for detecting the position of said tonearm in a horizontal direction with respect to a predetermined reference position and generating a first output in response thereto;
   second detecting means for detecting non-recorded portions of a record disk and generating a second output in response thereto;
   first memory means receiving said first output from said first detecting means and said second output from said second detecting means and operating to store said first output therein in response to an occurrence of said second output;
   selecting means for selecting desired music to be reproduced and generating a selection signal representative of an order of the selected music;
   second memory means receiving said selection signal from said selecting means;
   counter means for selectively counting said second output generated when said second detecting means detects a nonrecorded portion of said record disk which has not been previously detected;
   first comparator means to compare the contents of said first memory means with said first output when said first output representative of an initial position of music to be reproduced has been stored in said first memory means; and
   a second comparator means to compare the output of said counter means with the content of said second memory means where no first output representative of an initial position of one of said bands of music to be reproduced has been stored in said first memory means,
   wherein said reversible electric motor and said tonearm drive means are controlled by the outputs of said first and second comparator means.

2. The device of claim 1, wherein said first memory means comprises an up-down counter for receiving said first output in response to a tonearm movement, and a first memory, said up-down counter providing its output to said first memory in response to a receipt of said second output.

3. The device of claim 1, wherein said first and second memory means and said counter means comprise a random access memory section, said device further comprising interface means for receiving the outputs of said first and second detecting means and said selector means and converting outputs into binary coded signals.

4. The device of claims 1, 2 or 3, wherein said first detecting means comprises an encoder disk responsive to rotation of said reversible electric motor and sensor means responsive to disk rotation.

5. The device of claim 4, wherein said tonearm drive means comprises a lead screw rotated by said electric motor, a carriage mounted for movement on said lead screw, said carriage having a tonearm mounting and said encoder disk being mounted on said lead screw.

6. The device of claim 5, further comprising guide means for aligning said carriage.

7. The device of claim 5, wherein said tonearm has a cartridge with a stylus at one end thereof and said second detecting means is mounted at said one end in a vertical position aligned with said cartridge.

8. The device of claims 1, 2 or 3, wherein said selecting means comprises keyboard means for inputting a selected playing order of said bands of music on said record.

9. The device of claim 3, further comprising a read only memory for providing control signals to said random access memory said interface means and said first and second comparators.

10. The device of claim 9, further comprising a clock pulse generator for providing timing signals.

* * * * *